(12) United States Patent
DeWeert et al.

(10) Patent No.: US 12,632,007 B2
(45) Date of Patent: May 19, 2026

(54) PANORAMIC HOLOGRAPHIC IMAGERY WITH PHOTOREFRACTIVE AMPLIFICATION OF SUB PIXEL THREATS

(71) Applicant: BAE Systems Information and Electronic Systems Integration Inc., Nashua, NH (US)

(72) Inventors: Michael J. DeWeert, Kaneohe, HI (US); Reid A. Noguchi, Honolulu, HI (US); Somit S. Mathur, Austin, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 575 days.

(21) Appl. No.: 18/194,981

(22) Filed: Apr. 3, 2023

(65) Prior Publication Data

US 2024/0329597 A1 Oct. 3, 2024

(51) Int. Cl.
| | |
|---|---|
| *H04N 23/61* | (2023.01) |
| *G03H 1/00* | (2006.01) |
| *G03H 1/02* | (2006.01) |
| *G03H 1/22* | (2006.01) |
| *H04N 23/20* | (2023.01) |

(Continued)

(52) U.S. Cl.
CPC ......... *G03H 1/2249* (2013.01); *G03H 1/0005* (2013.01); *G03H 1/02* (2013.01); *G03H 1/2202* (2013.01); *H04N 23/20* (2023.01); *H04N 23/61* (2023.01); *H04N 23/695* (2023.01); *H04N 23/698* (2023.01); *H04N 23/90* (2023.01); *G02B 5/001* (2013.01); *G03H 2001/0033* (2013.01); *G03H 2001/0268* (2013.01);

(Continued)

(58) Field of Classification Search
CPC ........ G02B 5/001; G02B 5/32; G03H 1/0005; G03H 1/02; G03H 1/2202; G03H 1/2249; G03H 2001/0033; G03H 2001/0268; G03H 2001/2234; G03H 2001/2284; G03H 2222/12; G03H 2223/55; H04N 23/20; H04N 23/61; H04N 23/695; H04N 23/698; H04N 23/90
USPC ........................................................ 348/40
See application file for complete search history.

(56) References Cited

U.S. PATENT DOCUMENTS

| | | | | |
|---|---|---|---|---|
| 12,066,353 | B2 * | 8/2024 | Thorpe | ................... G01M 3/04 |
| 2015/0268630 | A1 * | 9/2015 | Azzazy | .............. G02B 27/0944 |
| | | | | 359/11 |
| 2016/0004221 | A1 * | 1/2016 | Ayres | .................... G03H 1/2645 |
| | | | | 359/30 |

* cited by examiner

*Primary Examiner* — Kathleen M Walsh
(74) *Attorney, Agent, or Firm* — Sand, Sebolt & Wernow LPA; Gary McFaline

(57) ABSTRACT

An optical detection system uses high-resolution holographic filters for target detection within a very-large field of view image acquired with a reflector. The holographic filter acts as an optical computer, mixing phase and amplitude information of known targets with light from the scene, automatically enhancing portions of the image that match threat objects or other object of interest. A lens forming a Fourier transform of the entire scene is used, and within that transform, the holographic information of a target or multiple targets is added. By acting as an inverse optical transfer function, the hologram gathers the target information to single point, and removes non-target background. Amplification is done by using a laser-illuminated hologram to create a phase-amplitude filter in a photorefractive material at the transform plane. By mixing the hologram and the scene at the transform plane, the matching is enhanced regardless of target location in the scene.

19 Claims, 6 Drawing Sheets

(51) Int. Cl.
    *H04N 23/695*       (2023.01)
    *H04N 23/698*       (2023.01)
    *H04N 23/90*        (2023.01)
    *G02B 5/00*         (2006.01)

(52) U.S. Cl.
    CPC ............... *G03H 2001/2234* (2013.01); *G03H 2001/2284* (2013.01); *G03H 2222/12* (2013.01); *G03H 2223/55* (2013.01)

Processor identifies hot pixels and sends cue

PANORAMIC HOLOGRAPHIC IMAGERY WITH PHOTOREFRACTIVE AMPLIFICATION OF SUB PIXEL THREATS

TECHNICAL FIELD

The present disclosure relates generally to optical detection systems.

BACKGROUND ART

There is a known need to equip various platforms with Situational Awareness (SA) to detect and track hostile intents against surface and aerial targets. In particular, providing an early warning of missiles or projectiles at the sub-pixel level is of paramount importance. Conventional camera technologies are limited in that regard because of their resolution, frame rate, and optics.

Optical detection systems utilize various optical devices, such as imagers/cameras, lens, focal plane arrays, processors, and the like to detect objects. Some previous optical devices include imaging circuits or chips that are tiled on a focal plane. One known exemplary system is the Argus system provided by Trillion Quality System. This system cooperates with hardware that has hundreds of imaging chips tiled on a focal plane. This hardware configuration has difficulties in abutting the chips together on the focal plane. As such, based on the physical configuration of this hardware, the processing performed for object detection requires a brute force method of image detection. However, brute force detection techniques often require significant processing power.

SUMMARY OF THE INVENTION

In an effort to overcome these brute force techniques, the present disclosure provides a system and method to optically cue an imaging system or optical detection system to only detect with the fine resolution multi-pixel imagers at or on a coarse resolution location so that the system does not need to process tera-pixels worth of data. The present disclosure optically cues an item or object of interest and some embodiments instruct an imager to capture high resolution imagery where it is needed. Then, the high resolution imagery may be processed in a significantly faster manner than the previous brute force techniques. Some embodiments of the present disclosure implement a process that combines Fourier optics with high resolution holographic filters that amplify the targets of interest. The amplification may be without gain, as via passive spatial filtering, or at a gain greater than one, via two-wave mixing (TWM) and spatial filtering in the photorefractive material. The combination of optical Fourier spatial filtering with photorefractive amplification provides unique advantages.

According to one aspect of one embodiment of the present disclosure, there is a wide field of view in a first optical assembly gathering an image with a relatively normal focal plane having normal resolution (for example about one giga-pixel). Then, there is a second optical assembly that performs match filtering to pick out or identify objects of interest. Then, the system cues an array of one or more imagers or cameras in an array of high resolution imagers or cameras to capture images at the points of interest.

Furthermore, the small scale high resolution imagers (that will read out the finer resolution in accordance with the hotspots from coarse resolution pixels) could be spatially distributed to account for biases in scene segmentation. For example, it may be desired to align a majority of the imagers to detect bright spots along the horizon line (e.g. Anti-surface missiles (ASMs)), while assigning less resources to detect surface craft or platforms below the horizon line.

Some exemplary methods and systems detailed herein include the use of high-resolution holographic filters for target detection within a very-large-FoV image acquired with an axicon mirror. The holographic filter acts as an optical computer, mixing phase and amplitude information of known targets with light from the scene, and automatically enhancing portions of the image that match threat objects. Because the processing is done optically, it proceeds instantaneously or nearly instantaneously, and at much finer resolution than can be captured by a conventional detector array. A lens forming the Fourier transform of the entire scene is used, and within that transform, the holographic information of a target or multiple targets is added. The changes in photorefractive material refractive index induced by laser illumination persist after the laser illumination is switched off. Thus, the filter operates as a passive filter, consuming little power during target detection. Erasing the filter is accomplished by flooding the material with bright laser illumination, causing charges to re-distribute so that a new optical filter can be written into the photorefractive material. A succession of filter creation and erasure sequences allows the filter to be quickly cycled through multiple states and used to detect multiple types of objects of interest.

In one exemplary embodiment or instantiation, the hologram is placed directly in the transfer plane. By acting as an inverse OTF (optical transfer function), the hologram gathers the target information to single point, and removes non-target background. For very small sub-targets, further amplification of the target may be required. The amplification is performed by using a laser-illuminated hologram to create a phase-amplitude filter in a photorefractive material at the transform plane. If the laser is much brighter than the scene, the laser-hologram induces refractive-index modulations that transfer energy from the laser to scene components that match the targets, thereby creating bright spots or hotspots on the focal plane, even for targets much smaller than a pixel. One exemplary embodiment provides for the processing to occur in the transform plane, but it may be processed elsewhere. By mixing the hologram and the scene at the transform plane, the matching is enhanced regardless of target location in the scene. The hologram can include multiple types of targets, as well as multiple aspects of each target, allowing simultaneous detection of multiple threats. Some embodiments require target amplification because the coarse-imager pixels are much larger than a target image, which would limit the contrast of un-amplified holographic matches.

In another aspect, one exemplary embodiment of the present disclosure may provide an optical detection system comprising: a reflector that reflects scenery light containing an object of interest; a laser generator that generates a laser beam; a hologram having a marker corresponding to the object of interest, wherein the laser beam is configured to be transmitted through the hologram; a photorefractive plate at a Fourier plane, wherein the photorefractive plate receives the laser beam and the scenery light, and the photorefractive plate is configured to amplify portions of the laser beam and the scenery light corresponding to the object of interest; wherein the laser beam writes the hologram of a Fourier transform at the Fourier plane, wherein the Fourier transform is formed directly or indirectly by optically transforming an image of the object of interest; an image focal plane having a coarse first resolution, wherein the image focal plane has pixels that illuminate as hotspots corresponding with the object of interest; a processor to process illuminated hotspots; and at least one imager having a fine second resolution within a group of a plurality of imagers, wherein the at least one imager is cued in response to the processor identifying a hotspot in the image focal plane that is indicative of the object of interest.

This exemplary embodiment or another exemplary embodiment may further provide that the hologram is located at the Fourier plane as part of the photorefractive plate. This exemplary embodiment or another exemplary embodiment may further provide that the hologram that is part of the photorefractive plate comprises non-object portions, wherein the marker and non-object portion cooperate to gather a signal for the object of interest to a single pixel, and the non-object portions removes background. This exemplary embodiment or another exemplary embodiment may further provide that the reflector has a 360° field of view. This exemplary embodiment or another exemplary embodiment may further provide that the reflector is an axicon mirror.

This exemplary embodiment or another exemplary embodiment may further include a first transfer optic that is optically between the reflector and the photorefractive plate; and a second transfer optic that is optically between the laser beam generator and the photorefractive plate. This exemplary embodiment or another exemplary embodiment may further include a beam splitter that is optically subsequent to the first transfer optic and the second transfer optic. This exemplary embodiment or another exemplary embodiment may further provide that the photorefractive plate and the hologram is optically subsequent to the beam splitter. This exemplary embodiment or another exemplary embodiment may further include a third transfer optic that is optically between the photorefractive plate and the image focal plane. This exemplary embodiment or another exemplary embodiment may further provide that the third transfer optic converts a de-focused image from the photorefractive plate into a focused image for the image focal plane.

This exemplary embodiment or another exemplary embodiment may further include a steering mechanism coupled to the at least one imager. This exemplary embodiment or another exemplary embodiment may further provide that the steering mechanism is a digital steering mechanism.

This exemplary embodiment or another exemplary embodiment may further include a non-linear crystal in the photo refractive plate that is encoded with a pattern that matches the marker corresponding to the object of interest.

This exemplary embodiment or another exemplary embodiment may further provide that the scenery light and laser beam are collimated.

In yet another aspect, one exemplary embodiment of a method or process may provide a method for an optical detection system, the method comprising: reflecting scenery light from a scene having an object of interest with a reflector; transmitting the scenery light to a photorefractive plate at a Fourier plane; generating a laser beam; transmitting the through a hologram having a marker corresponding to the object of interest to the photorefractive plate; optically transforming the scenery light and laser beam to identify the object of interest in the scenery light that matches the marker in the hologram to create an optical representation of the object interest; transmitting the identified optical representation of the object of interest to an image focal plane having a coarse first resolution; illuminating at least one pixel on the image focal plane corresponding to the identified optical representation of the object of interest; cueing an imager sensor having a fine second resolution that is part of a plurality of image sensors to capture an image of the object of interest in the scene based on the at least one pixel in the image focal plane having been illuminated; and capturing, with the image sensor, an image of the object of interest in the scene.

This exemplary embodiment or another exemplary embodiment may further include splitting, via a beam splitter, the laser beam and the scenery light, wherein the beam splitter is optically prior to the photorefractive plate. This exemplary embodiment or another exemplary embodiment may further include focusing defocused light from the photorefractive light onto the image focal plane. This exemplary embodiment or another exemplary embodiment may further include steering the image sensor to a location to capture the image of the object of interest.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
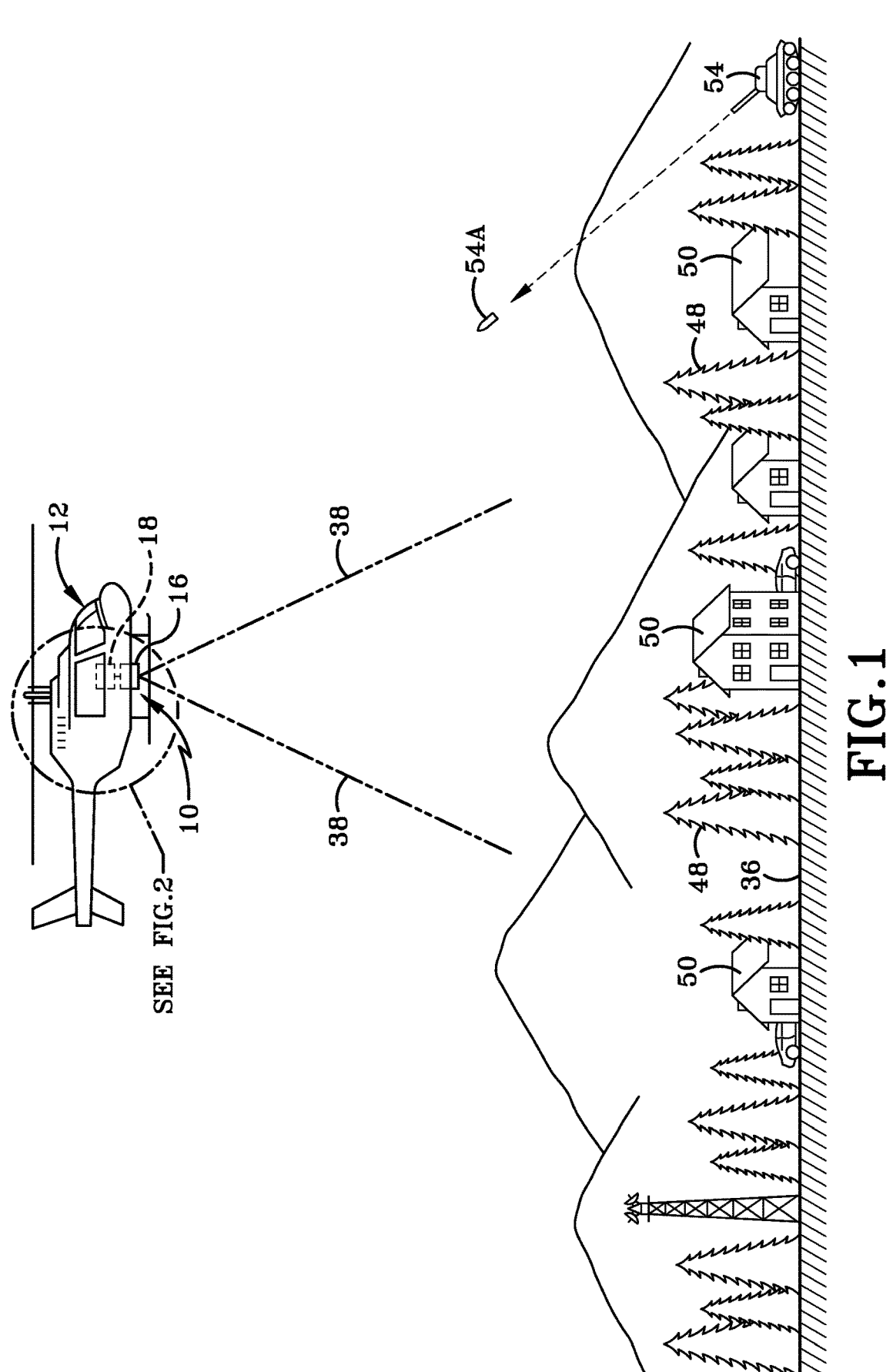
FIG. 1 (FIG. 1) is a diagrammatic view of a platform carrying an exemplary object detection system that implements an optical detection technique of the present disclosure while traveling over an environment in which a field of view from optical assembly is directed towards a geographic landscape.
Figure 2:
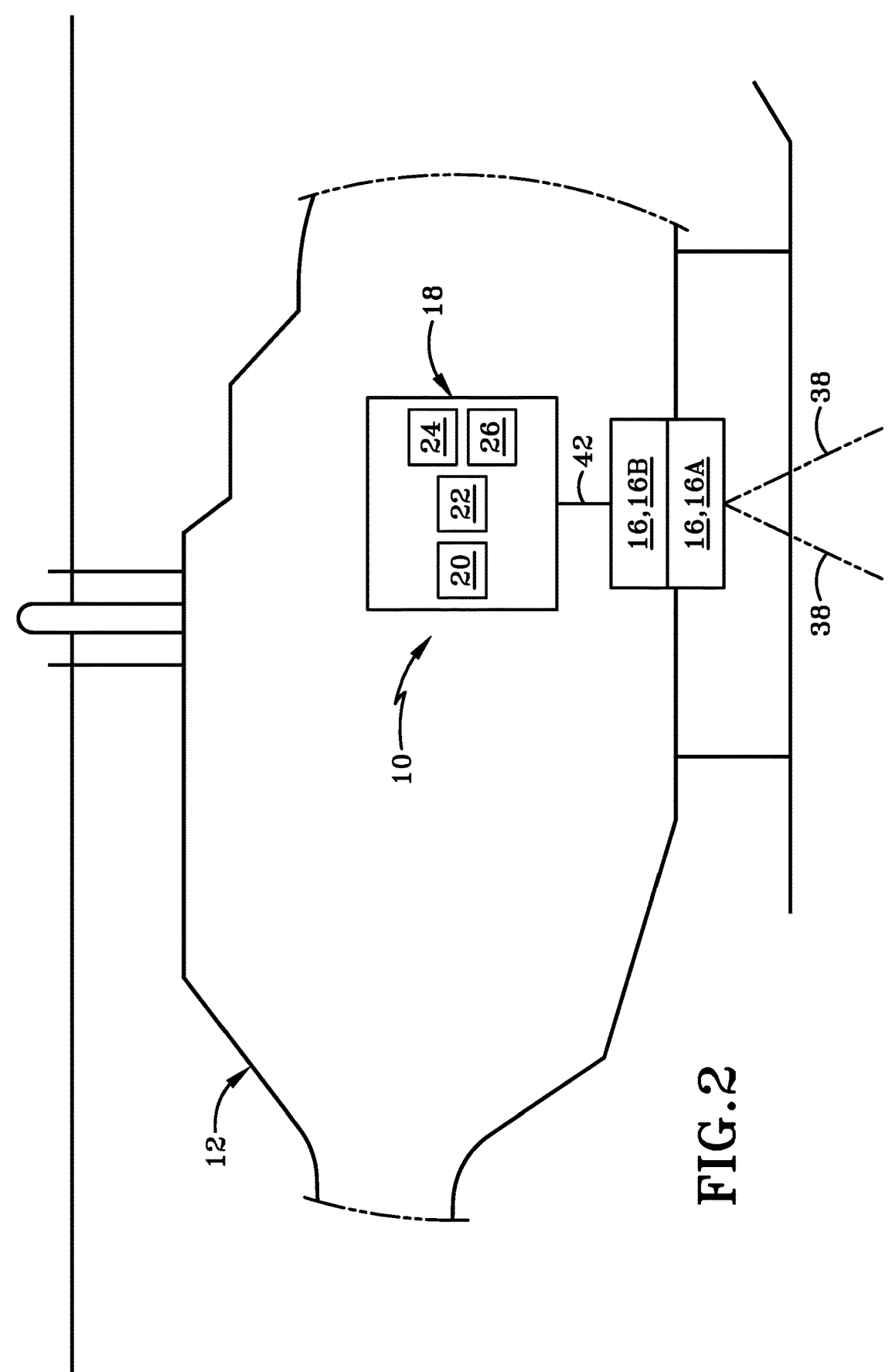
FIG. 2 (FIG. 2) is an enlarged schematic view of a portion of the platform carrying the object detection system as highlighted by the dashed circle labeled "SEE FIG. 2" from FIG. 1

FIG. 1 and FIG. 2 diagrammatically depicts an object detection system for a filtered object determination/detection technique in accordance with certain aspects of the present disclosure and is shown generally at 10. The object detection system 10 is operably engaged with a platform 12 and includes at least one optical assembly 16, at least one processor 18, temporal data logic 20, spatial data logic 22, detection logic 24, and cueing logic 26.

In accordance with one aspect of the present disclosure, the platform 12 may be any moveable platform configured to be elevated or equal relative to a geographic landscape 36. Some exemplary moveable platforms 12 include, but are not limited to, unmanned aerial vehicles (UAVs), manned aerial vehicles, projectiles, guided projectiles, or any other suitable moveable platforms. Any of the exemplary platforms may be land-based (i.e., trucks, tanks, cars, cell towers, buildings), air-based (i.e., helicopters, drones, planes, blimps, or the like), space-based (i.e., satellites, spacecraft or the like), or sea-based (ships/boats, submarines/submersible craft or the like). Additionally, platform 12 may be a stationary structure like a cell phone tower, building or any other non-moving or fixed structure.

When the platform 12 is embodied as a moveable aerial vehicle, the platform 12 may include a front end or a nose opposite a rear end or tail. Portions of the object detection system 10 may be mounted to the body, the fuselage, or internal thereto between the nose and tail of the platform 12. While FIG. 1 depicts that some portions of the object detection system 10 are mounted or carried by the platform 12 adjacent a lower side of the platform 12, it is to be understood that the positioning of some components may be varied and the figure is not intended to be limiting with respect to the location of where the components of the system 10 are provided. For example, and not meant as a limitation, the at least one optical assembly 16 is mounted on the platform 12. Furthermore, some aspects of the at least one optical assembly 16 may be conformal to the outer surface of the platform 12 while other aspects of the at least one optical assembly 16 may extend outwardly from the outer surface of the platform 12 and other aspects of the at least one optical assembly 16 may be internal to the platform 12.

In one exemplary embodiment, the at least one optical assembly sensor 16 may include a first optical assembly 16A and a second optical assembly 16B that are in operative communication with each other. However, other embodiments may utilize only a single optical assembly. While the components detailed herein with respect to either the first optical assembly 16A or the second optical assembly 16B are discussed with respect to one of the assemblies, it is to be understood that the components detailed herein could be in a single optical assembly or could located as part of the other optical assembly or more than two optical assemblies that are in operative communication with each other.

The first optical assembly 16A and/or the second optical assembly 16B may be either an active image sensors or a passive image sensors. One particular embodiment provides that both the first optical assembly 16A and the second optical assembly 16B are passive image sensors. When, the optical assemblies 16A, 16B are passive image sensors, they are configured to observe scenes remote from the platform 12, such as, for example, a geographic landscape 36 within its field of view (FOV) 38. In the shown example, the first optical assembly 16A and the second optical assembly 16B share the same or a effectively similar (i.e., differing by no more than 10%) FOV 38.

Further, when either one of the at least one optical assembly 16 is embodied as an imager, the imager may be any imager capable of imaging terrain, such as, for example, a visible light imager, infrared (IR), a near-infrared imager, a mid-infrared imager, a far-infrared imager, or any other suitable imager. In one example, the imager has a frame rate of at least 100 frames per second. In another example, the imager has a frame rate of at least 500 frames per second. In yet another example, the imager has a frame rate between approximately 500 frames per second and approximately 1,000 frames per second. Although certain frame rates of the imager have been described, it is to be understood that the imager may have any suitable frame rate. For example, a frame rate of 10 Hz would also be acceptable.

The at least one optical assembly 16, which may be an IR imager, being a passive sensor 16. The term passive with respect to the imager refers to the at least one sensor 16 or the imager configured to view/receives data observed through its FOV 38 of the scene that is being observed, but does not actively produce or generate a source of energy that propagates outward from the sensor to thereafter obtain a received signal (such as that would be common with an active sensor, such as LIDAR or radar).

The sensor in the at least one optical assembly 16 may be one of many sensors on platform 12, such as a plurality of IR sensors or IR imagers, each including at least one focal plane array (FPA). Each FPA comprises a plurality of pixels. The IR sensors are able to detect spectral wavelengths. In this present disclosure, the IR sensors are capable of detecting multiple wavelengths in the visible and/or nonvisible spectrum of light.

The data or information from pixels that form one image have a spatial orientation relative to other pixels. Adjacent pixels in an image typically have shared or common information to an adjacent pixel in the overall image. The use of spatial data as referred to herein, refers to spatial data in the image. Thus, the present disclosure uses information in an image near a particular pixel to generate a detection, classification, decision, or determination of a candidate object at that pixel.

Furthermore, when the at least one optical assembly 16 is embodied as an imager, the imager will have some components that are common to image sensors such as lens, domes, focal plane arrays, and may additionally include processors such as a Graphical Processing Unit (GPU), which may be an exemplary processor 18, and associated processing hardware. Towards that end, a reader of the present disclosure will understand that the at least one optical assembly 16 may include imaging components adapted to sense, capture, and detect imagery within its FOV 38. The imagery may be in a spectrum that is not viewable to the human eye, such as, for example, near-infrared imagery, mid-infrared imagery, and far-infrared imagery. However, one particular embodiment of the present disclosure utilizes IR imagery.

While the FOV 38 in FIG. 1 is directed vertically downward towards the geographic landscape 36, it is further possible for a system in accordance with the present disclosure to have at least one optical assembly 16 that projects its FOV 38 outwardly and forwardly from the nose of the platform 12 or outwardly and rearward from the tail of the platform 12, or in any other suitable direction. However, as will be described in greater detail below, certain implementations and embodiments of the present disclosure are purposely aimed downward so as to capture a scene image from the geographic landscape 36 to be used to provide navigation and/or position and/or location and/or geolocation information to the platform 12.

Generally, the at least one optical assembly 16 has an input and an output. An input to the sensor 16 may be considered the scene image observed by the FOV 38 that is processed through the imagery or sensing components within the sensor 16. An output of the sensor may be an image captured by the sensor 16 that is output to another hardware component or processing component.

FIG. 2 depicts the at least one processor 18 is in operative communication with the at least one optical assembly 16. More particularly, the at least one processor 18 is electrically connected with the output of the optical assembly 16. In one example, the at least one processor 18 is integrally formed within optical assembly 16. In another example, the processor 18 is directly wired the output of the optical assembly 16. However, it is equally possible for the at least one processor 18 to be wirelessly connected to the optical assembly 16. Stated otherwise, a link 42 electrically connects the optical assembly 16 to the at least one processor 18 (which may be entirely physically internal to the housing associated with optical assembly 16) and may be any wireless or wired connection, integral to the optical assembly 16 or external to optical assembly 16, to effectuate the transfer of digital information or data from the optical assembly 16 to the at least one processor 18. The at least one processor 18 is configured to or is operative to generate a signal in response to the data received over the link 42 from the optical assembly 16.

In accordance with one aspect of the present disclosure, the processor 18 may be a GPU that is performing the processing functionality to detect the object detection technique described herein, which may be a portion of a threat warning or countermeasure method or process. The GPU may be located on the platform or it may be located at a remote location separated from the platform, wherein when the GPU is at a remote location wireless signal transmission logic would be present on the platform to send the signal data to a receiver that feeds the signal data to the GPU for processing.

In some implementations, the data that is sent over the link 42 are on scene image or scenery light (or multiple scene images or video streams composed of sequential frames) captured by the optical assembly 16 that is observing the geographic landscape 36 below through its FOV 38. As will be described in greater detail below, the at least one processor 18 may include various logics, such as, for example, temporal data logic 20, spatial data logic 22, detection logic 24, and cueing logic 26, which performs functions described in greater detail below.

With continued reference to FIG. 1, and having thus described the general structure of object detection system 10, reference is now made to features of the geographic landscape 36. For example, and not meant as a limitation, the geographic landscape 36 may include natural features 48, such as trees, vegetation, or mountains, or manmade features 50, such as buildings, roads, or bridges, etc., which are viewable from the platform 12 through the FOV 38 of the sensor 16. Also within the FOV 38 is a candidate object 54, which may be a threat or another object of interest. System 10 is configured to detect a candidate object. Further, other embodiments of system 10 may classify and determine whether the candidate object is moving toward the platform. Namely, the system detects whether the object 54 or projectile 54A is an object of interest. Another embodiment of system 10 may classify whether the platform 12 "is the one" (i.e., you are the one—YATO) or is not the one (i.e., you are not the one—YANTO) that the object 54 or a projectile 54A fired from the object 54 is moving toward (wherein the projectile 54A can considered one type of object 54).

The system 10 uses the optical assembly 16 to capture a scene image or scenery light from a scene remotely from the platform 12 and the at least one processor 18 generates a signal in response to the optical assembly 16 capturing the scene image. More particularly, and as detailed further herein, the scene image or scenery light may be captured by the first optical assembly 16A which is then processed in the manner detailed herein and transmitted to the second optical assembly 16B to perform further scene discrimination in a higher resolution manner as taught herein. Metadata may be provided for each captured scene image of scenery light. For example, and not meant as a limitation, the metadata may include a frame number of the scene image within a flight data set, a latitude position of the platform 12 in radians, a longitude position of the platform 12 in radians, an altitude position of the platform 12 in meters, a velocity of the platform 12 in meters per second, and a rotation of the platform 12 in degrees. Metadata associated with the at least one sensor 16 may also be provided, such, as, for example, mounting information related to the at least one optical assembly 16. Although examples of metadata have been provided, it is to be understood that the metadata may include any suitable data and/or information.

Temporal data logic 20 includes at least one non-transitory computer readable storage medium having instructions encoded thereon that, when executed by the at least one processor 18, implements operations to obtain a single band or multiple bands (i.e. multichannel-different parts of the infrared spectrum) of image data at a certain time that depicts object 54 or projectile 54A that are captured together in an image or in a frame of a video stream from the optical assembly 16.

Spatial data logic 22 includes at least one non-transitory computer readable storage medium having instructions encoded thereon that, when executed by the at least one processor 18, implements operations to determine the spatial locality or spatial position of a candidate object 54 or projectile 54A relative to a pixel on the focal plane array within image data from an image or from a frame of a video stream from the optical assembly 16.

Detection logic 24 includes at least one non-transitory computer readable storage medium having instructions encoded thereon that, when executed by the at least one processor 18, implements operations to perform a static detection technique, an active detection technique or a machine learned detection technique to yield an object detection, decision, or determination as to whether object 54 or projectile 54A is present and optionally whether the object or projectile moving toward platform 12 based on a review of information obtained from optical assembly 16.

The cueing logic 26 may include at least one non-transitory computer readable storage medium having instructions encoded thereon that, when executed by the at least one processor 18, implements operations to cue the second optical assembly 16B to discriminate the relevant object information obtained from the first optical assembly 16A and instruct the second optical assembly 16B to capture a more robust or high resolution image of the object or projective for further detection, classification, decision, or determination.

After the detection, classification, decision, or determination technique has been performed in the system 10, the output may be a detection determination signal. Then, the detection determination signal may be fed to the downstream or subsequent techniques of the threat warning system or a countermeasure system for higher discriminatory processing to perform an evasive or defensive action if the detection determination signal was determined to be a threat to the platform 12.

Having thus described the general components of the system 10 that implement the object detection techniques, protocols, process, or methods detailed herein, reference is now made to embodiments of the optical assembly 16, its operation and the algorithmic operations that accomplish said operation of the object detection system 10.

Figure 3:
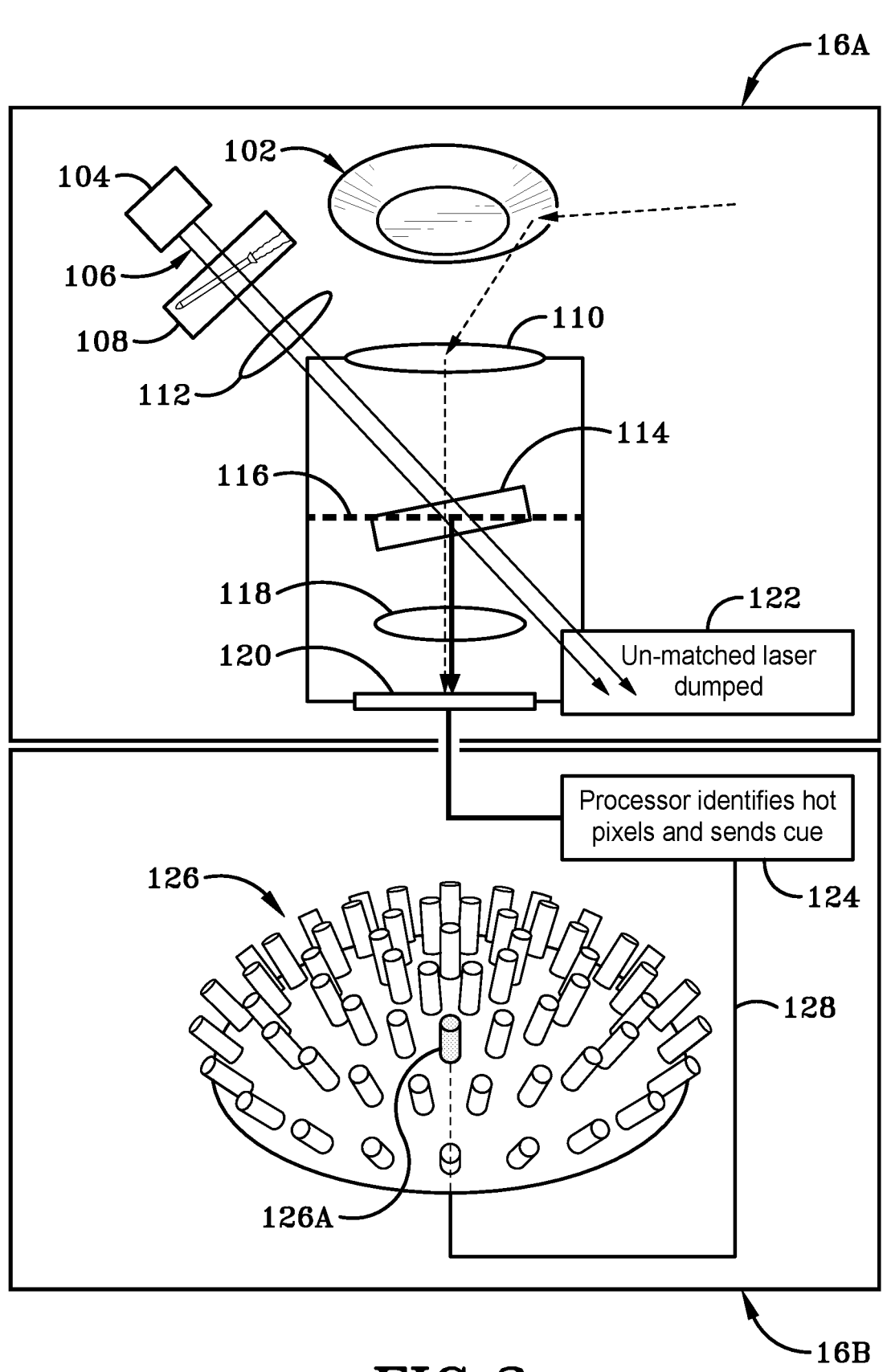
FIG. 3 (FIG. 3) is a schematic view of one embodiment of an optical assembly of the object detection system.

FIG. 3 depicts that first optical assembly 16A, which is part of the at least one optical assembly 16, includes a reflector 102, a laser beam generator 104 that generates laser beam 106, a hologram 108, first transfer optics 110, second transfer optics 112, a photorefractive plate 114, a Fourier plane 116, third transfer optics 118, an image plane 120, and a beam dump 112. The second optical assembly 16B, which is part of the at least one optical assembly 16, includes a GPU 124 and plurality of imagers for cameras 126.

Reflector 102 is an optical device capable of reflecting light or other electromagnetic radiation from the scenery remote from platform 12. In one particular embodiment the reflector 102 is able to reflect scenery light within the field of view 38. In another particular embodiment, the reflector 102 reflects light with a full 360 degrees surface from the scene. However, other embodiments may utilize a surface that is less than 360 degrees. On exemplary reflector 102 is an axicon mirror having an annular surface that circumscribes a center axis and extends between an outer radius and an inner radius, wherein the surface is tapered or slanted between the outer between the outer radius and the inner radius. In one embodiment, the slanted or tapered surface may disposed at an angle that is about 50 degrees relative to a vertical axis. However, in other embodiments, the angle be between 30 degrees and 80 degrees depending on the application specific needs of the system. The surface that is sloped, slanted or tapered at an angle relative to the vertical axis extends radially 360 degrees around the vertical axis to create a 360 degree Field of view. In one embodiment, the reflector 102 is a diverging axicon mirror. This surface is a highly reflective surface capable of reflecting the light from the scene within the field of view 38 of the optical assembly 16. The reflector 102 is in optical communication with the first transfer optics 110. The first transfer optics 110 may include lenses, prisms, optical wave guides, or other optical devices configured to transmit the light reflected from the reflector 102 through the optics 110 and towards the photo refractive plate 114. System 10 utilizes laser illumination to produce, in the photorefractive plate 114, a pattern of refractive index variations which match the conjugate of the Fourier transform of the image of an object of interest. This pattern constitutes a spatial filter for light. When light containing a Fourier transform of the image of said object subsequently passes through the plate 114, the refractive-index variation acts as a multiplier, modulating the incoming light by the filter. The optical Fourier transform appears at the transform plane of primary aperture 106. Multiplication of two Fourier transforms effects a cross-correlation between the filter and the object. Optically inverse-transforming the cross-correlating light then concentrates images that match the filter in into bright spots on the image plane. A designer of system 10 should design the refractive index variations so that matching-light bright spots preferentially direct towards the image plane, and un-matched light diffracts away.

With continued reference to reflector 102, in order to provide 360° azimuthal coverage within the confines of a single sensor, axicon optical forms are used. The vertical aspect coverage desired is accomplished by designing the length and angles of the axicon mirror in conjunction with the more standard lenses forming the intermediate focal plane and the objective lenses which relay an image to a moderate-resolution detector array, such as image plane 120.

Laser beam generator 104 generates laser beam 106 that is in optical communication with the hologram 108. One exemplary hologram 108 is a fine resolution hologram with encoded markers representing the target object of interest that is to be detected, such as object 54 or projectile 54A. Stated otherwise, the encoded markers may be considered a detection template or a synthetic target image that represent the object of interest. The hologram 108 may be either a static hologram or a dynamic hologram that is able to be dynamically changed or encoded with different markers representing the encoded object of interest. When the hologram 108 is a fixed or static hologram, it has optical markers representing the target or object of interest. When the laser beam 106 interacts with the hologram 108, optical signals representing the markers are transmitted through the second optics 112 towards the photorefractive plate 114. Similarly, when the hologram 108 is a dynamic hologram, the optical signals representing the markers that were encoded onto the hologram are illuminated by laser beam 106 and transferred through the second optics 112 towards the photorefractive plate 114. The hologram 108 element acts as an amplitude-phase matched filter. The hologram is recorded at very high resolution "i.e. molecular resolution", and the light from the reflector 102 is also at very high resolution, up to the diffraction limits of optical elements 102 and 110. Further, multiple target types and aspects can be encoded on a single hologram 108 and it is not necessarily to encode only a single object type or a single marker type in hologram 108.

With respect to the hologram 108, some embodiments may utilize monochromatic holograms, and/or analog holograms, to provide very fine (molecular-scale) resolution. Other embodiments may utilize multi-laser holograms for natural-light illuminated scenes would enable spatial-spectral holographic matching, thereby further improving detection. Other embodiments may encode the holograms in programmable spatial-light modulators (SLMs), thereby increasing system flexibility and ability to detect novel threats. Other embodiments may utilize velocity sensing filters with the aid of knife-edges in the Fourier plane and tuned holographic elements, thereby capitalizing on the inherent velocity sensitivity of the photorefractive effect. This would provide "one-shot" speed discrimination of threat objects, increasing system response and warfighter or platform 12 survivability.

The laser beam that has been transmitted through the hologram 108 and optics 112 mixes with the incoming light from the optics 110 representing the scenery light reflected by the reflector 102 at the photorefractive plate 114. The photorefractive plate mixes the scenery light with the laser hologram at the Fourier transform plane 116. Because the mixing is optical, it operates at fine spatial resolution, without time-consuming digital processing. The laser beam 106 amplifies light matching the markers representing the object transforms in the scenery image or scenery light. This amplified light is transmitted through the third optics 118 and transmitted to the image plane 120. In one particular embodiment, the image plane 120 is a coarse resolution plane having a FPA with multiple pixels.

At the coarse resolution image plane 120, the holographic matches yield bright pixels on the image plane, which may be a focal plane array. The unmatched portions of the laser beam 106 that have mixed with the scene imagery or scenery light at the photorefractive plate maybe dumped and transmitted to the laser beam dump 122 for disposal. With respect to the photo refractive plate 114, the phase and amplitude match between the hologram and the object in the scene yields a hotspot in the relevant pixel in the image plane or on the focal plane array of the image plane 120.

The image plane 114, which again may be a focal plane array (FPA), is in electrical communication with GPU 124 (which may be part of processor 18 or be processor 18 itself) in the second optical assembly 16B. GPU 124 processes the illuminated or "hot" pixels (i.e., hotspots) on the image plane 120 that operates in combination with the cueing logic 26 that is in operative communication with the plurality of imagers 126 in the second optical assembly 16B. The cued pixels are associated with at least one of the imagers within the plurality of imagers 126. For example as shown in FIG. 3, the imager 126A from the plurality of images 126 has been sent a cueing signal along link 128 (which may be any wired or wireless link) from the GPU 124 such that the cued imager 126A can be activated to detect or capture the object of interest 54 or the projectile 54A that has been detected as having the identifying features or markers as indicated in the hologram 108. By cueing only a single or a few imagers, such as imager 126A from the plurality of imagers 126 it allows system 10 to hologram match the "hot" pixels (i.e., hotspots) in the first optical assembly 16A to thereby reduce pixel rate and processing burden of the system 10. This also provides for altitude range imaging via the second optical assembly 16B utilizing the hologram matched "hot" pixels from the first optical assembly 16A. With respect to the plurality of imagers 126, they each provide a narrow field of view relative to the reflector 102.

Figure 4:
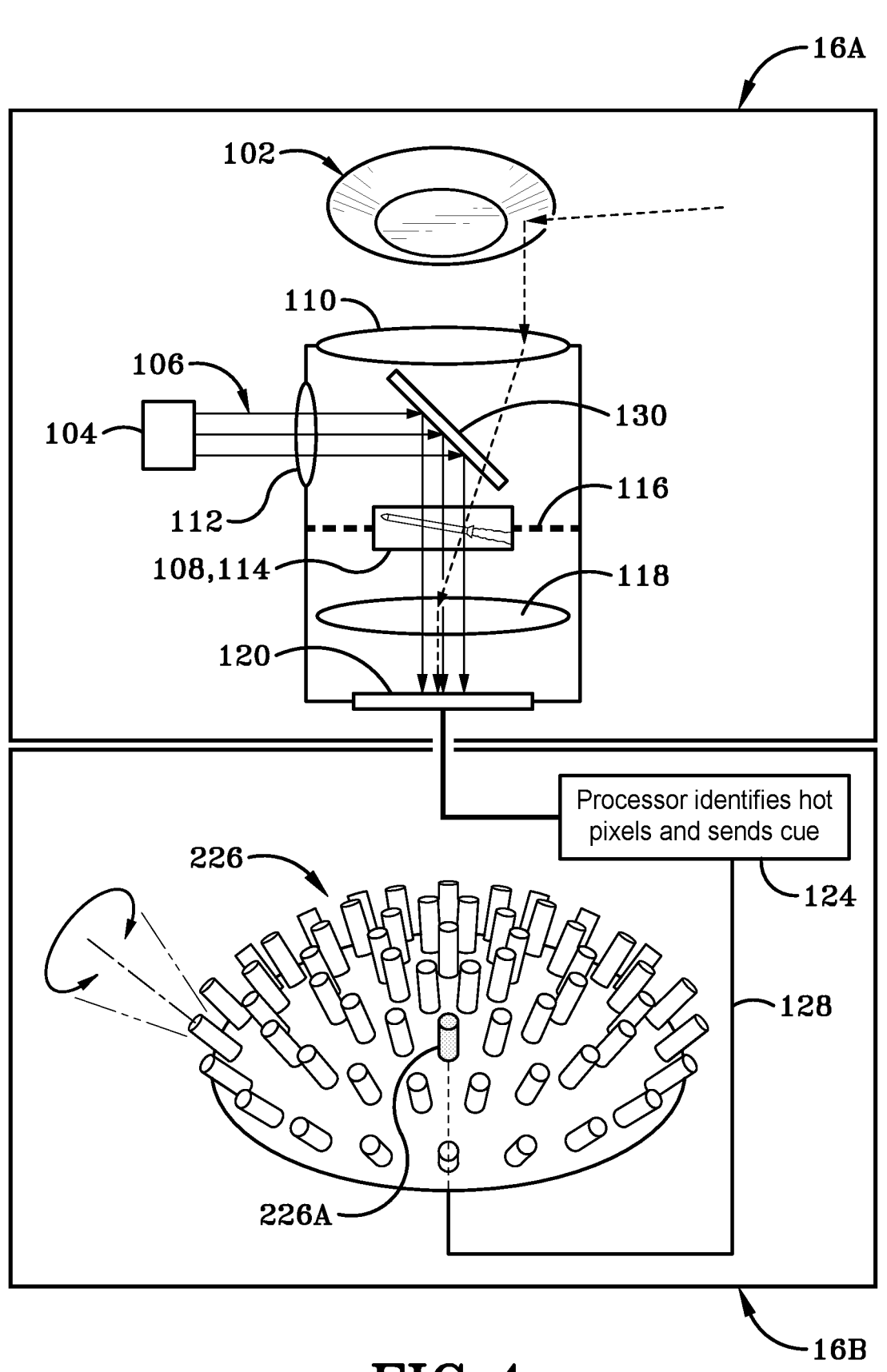
FIG. 4 (FIG. 4) is a schematic view of another embodiment of an optical assembly of the object detection system.

FIG. 4 depicts another exemplary embodiment that utilizes a beam splitter 130 in the first optical assembly 16A to mix the laser beam 106 and the scenery light from the scene or landscape 36 that is reflected from reflector 102. In this embodiment, the hologram 108 is located at the Fourier transform plane 116 as part of the photorefractive plate 114. The beam splitter 130 may be any type of beam splitter capable of mixing a laser beam with reflected light. The beam splitter may be formed of any material that accomplishes this function, however it is envisioned that the beam splitter should have a relatively small and lightweight form factor so as to not add significant size, weight, power and/or cost to first optical assembly 16A or to the overall at least one optical assembly 16 that is part of system 10. The configuration shown in FIG. 4 is particularly effective when laser power must be conserved, because the changes in photorefractive plate 114 refractive index induced by laser illumination persist after the laser illumination is switched off. Thus, the filter can operate passively, consuming little power during target detection. A succession of filter creation and erasure sequences allows the filter to quickly cycle through multiple states and detect multiple types of objects of interest, while consuming little power. Turning off the laser during target detection also minimizes interference from stray laser light. This interference is geometrically more likely when the image plane is in the laser-illumination path, as in FIG. 4 and FIG. 6, as opposed to having the image plane only in the indirect diffracted laser illumination path as shown in FIG. 3 and FIG. 5.

In this example, the beam splitter 130 is optically subsequent to the first transfer optics 110 and the second transfer optics 112. However, it is possible for the beam splitter to be located optically prior to the first transfer optics 110 and the second transfer optics 112 if desired to meet a different application specific need. The beam splitter 130 mixes the light from reflector 102 with laser beam 106 and transmits the mixed light and laser beam to the photorefractive plate 114 at the Fourier transform plane 116. The remainder of this example operates similar to that which was shown and described in FIG. 3 and elsewhere detailed herein.

Figure 5:
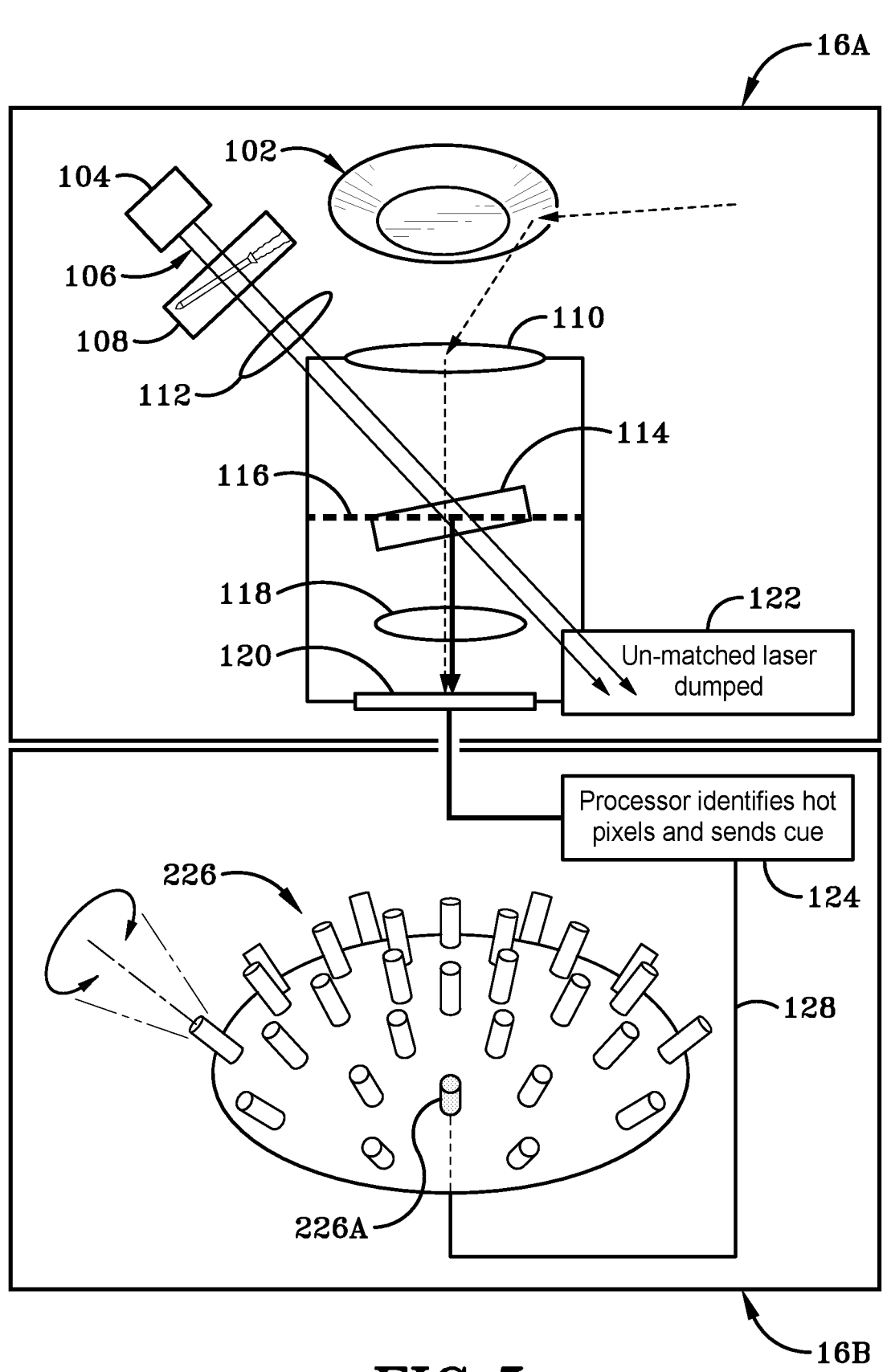
FIG. 5 (FIG. 5) is a schematic view of another embodiment of an optical assembly of the object detection system.

FIG. 5 depicts another exemplary embodiment that utilizes a first optical assembly 16A similar to which was taught in FIG. 3. However, the optical assembly that utilizes beam splitter 130, as shown in FIG. 4, could also be utilized. Particularly, the embodiment of FIG. 5 depict that the second optical assembly 16B has a fewer amount of a plurality of imagers 226 than the amount of imagers 126 taught in previous embodiments. In FIG. 5, a fewer amount of imagers 226 are needed because each of the imagers 226 are steerable, as opposed to being fixed imagers like the fixed imagers 126 detailed in FIGS. 3-4.

Operationally, the steerable imagers 226 receive processed data representing the illuminated or hotspot pixels on the image plane 120 that operates in combination with the cueing logic 26 or GPU 124 that is in operative communication with the plurality of imagers 226 in the second optical assembly 16B. The pixels cued from plane 120 are associated with at least one of the imagers within the plurality of imagers 226. For example as shown in FIG. 5, the imager 226A from the plurality of imagers 226 has been sent a cueing signal along link 128 (which may be any wired or wireless link) from the GPU 124 such that the cued imager 226A can be activated to detect or capture the object of interest 54 or the projectile 54A that has been detected as having the identifying features or markers as indicated in the hologram 108. In this example, the imager 226A may also be sent a location component as part of the cueing signal sent along link 128 that instructs the imager 226A to steer it to a location of the object of interest 54 or the projectile 54A. Because the imagers 226 are steerable, as opposed to being fixed or static, a fewer total number of imagers 226 may be utilized to effectively cover or view the same area as the imagers 126 in the other embodiments. Having fewer steerable imagers 226 as compared to more fixed imagers 126 may assist the embodiment of second optical assembly 16B to reduce size, weight, power and/or cost of the second optical assembly 16B or of the overall at least one optical assembly 16 that is part of system 10. By cueing and steering only a single or a few imagers, such as imager 226A from the plurality of imagers 226, it allows system 10 to hologram match the "hot" pixels (i.e., hotspots) in the first optical assembly 16A to thereby reduce pixel rate and processing burden of the system 10. This also provides for altitude range imaging via the second optical assembly 16B utilizing the hologram matched "hot" pixels from the first optical assembly 16A. With respect to the plurality of imagers 126, they are a narrow field of view relative to the reflector 102.

With continued reference to imagers 226, they may utilize piezo-electric steering. Utilizing piezo-electric steering enables the number of imagers 226 to be reduced to about one hundred imagers 226 or less. It is contemplated that each individual imager from the plurality of imagers 226, such as imager 226A, is piezo-electrically steerable over several degrees. One particular embodiment provides that each imager in the plurality of imagers 226 is steerable over a range about four degrees, which is to enable a full 360 degree Coverage when there are about one hundred imagers 226 in the second optical assembly 16B.

Figure 6:
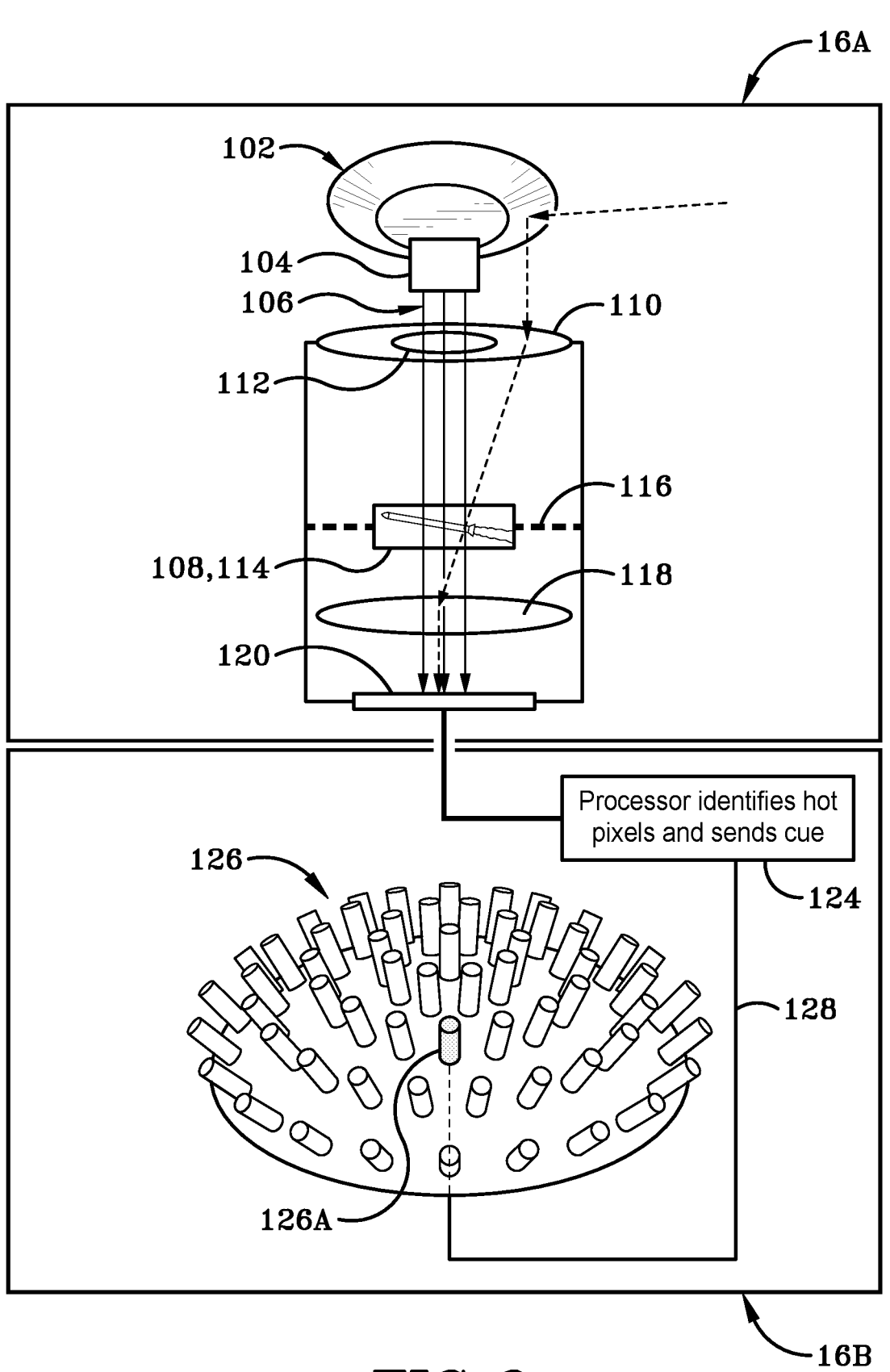
FIG. 6 (FIG. 6) is a schematic view of another embodiment of an optical assembly of the object detection system.

FIG. 6 depicts an alternative embodiment of first optical assembly 16A in which the laser generator 104 and reflector 102 are positioned in a manner such that laser beam 106 is collimated with the light reflected from reflector 102. This allows the use of only a single transfer optic 111 and eliminates the need for first transfer optic 110 and second transfer optics 112 that were shown in the other embodiments. By collimating the laser beam 106 with the light reflected from the reflector 102, the collimated beam and light are transferred through optics 111. In this embodiment, the hologram 108 is located at the Fourier transform plane 116 as part of the photorefractive plate 114. The photorefractive plate 114 mixes the scenery light with the laser hologram 108 at the Fourier transform plane 116. The laser beam 106 amplifies light matching the markers representing the object transforms in the scenery image or scenery light. This amplified light is transmitted through the third optics 118 and transmitted to the image plane 120. In one particular embodiment, the image plane 120 is a coarse resolution plane. At the coarse resolution image plane 120 the holographic matches yield bright or hotspot pixels on the image plane 120, which may be or include a focal plane array. The unmatched portions of the laser beam 106 that have mixed with the scene imagery or scenery light at the photorefractive plate maybe dumped and transmitted to the laser beam dump (not shown in FIG. 6) for disposal. With respect to the photorefractive plate 114, the phase and amplitude match between the hologram and the object in the scene yields a hotspot or on the relevant pixel in the image plane or on the focal plane array of the image plane 120. The second optical assembly 16B may be any of the types described herein. The changes in photorefractive plate 114 refractive index induced by laser illumination also persist after the laser illumination is switched off. Thus, the filter can operate passively, consuming little power during target detection. This mode of operation will be most useful when power consumption is constrained, and signal amplification is not required. A succession of filter creation and erasure sequences allows the filter to be quickly cycled through multiple states and used to detect multiple types of objects of interest, while consuming little power.

Having thus described the configuration of the various embodiments of optical detection system 10, reference is now made to various operations and advantages thereof.

In operation, to achieve a wide field of view (i.e., 360°) the reflector 102 may be a divergent axicon mirror. Alternatively, a convergent axicon mirror can be utilized in conjunction with appropriate optics that enables the laser beam that passed through the hologram 108 to mix at the photorefractive plate 114. However, an axicon mirror is not required as the operations of present disclosure can be accomplished with any wide field of view or panoramic field of view imager. The light from the reflector 102 is then projected down to or through a set of optics, such as first optics 110 (or optics 111 when utilizing the embodiment depicted in FIG. 6). The first transfer optics 110 takes the real image and de-focuses it. In the optical order of operation, when the de-focusing is accomplished, there is a place where the image is a Fourier transform of the incoming image at whatever distance the system is operating. Then, the incoming image is Fourier transformed optically at the Fourier plane 116. The Fourier plane 116 is the location where the transform is at its best or optimum.

The optics, such as third optics 118, that are after the Fourier plane 116 in the optical order of operations then convert the de-focused image into a focused image. At the transform plane, there is a non-linear crystal, such as the photorefractive plate 114. The crystal in the photo refractive plate is encoded with a pattern that matches the objects of interest. With the pattern on the non-linear crystal, any object of interest that matches the pattern can be effectively amplified. Particularly, incoming light to the signal of the object of interest is amplified with the pattern on the non-linear crystal. Then, the amplified pattern is projected through the optical system to the focal plane of the image plane 120 and the hot spots are then able to be identified to focus high resolution cameras or imagers 126 or 226 on those hot spots. The non-matching light or signal can then be discarded or diffracted away.

In one embodiment, the pattern is not directly encoded onto the photo reactive plate or the non-linear crystal, but rather it is programmable so there is a hologram 108 with some targets or markers on it that are in operative communication with laser beam 106. The laser beam 106 projects through the hologram 108 and optics, such as optics 112 (or optics 111 when utilizing the embodiment depicted in FIG. 6) to transform them to the Fourier plane 116. Laser beam 106 interacts with the non-linear crystal at the photorefractive plate 114. The non-linear crystal, such as a photorefractive plate 114 sets up a pattern that would be the pattern desired to be put into a standard hologram. However, this hologram is programmable because the laser 106 is projecting its beam through the holographic plates in hologram 108 that can be switched or rotated or changed. The laser beam 106 is used to project the pattern onto the plane with respect to the object of interest. The incoming light might or might not have a signal that matches the pattern for an object of interest, such as object 54 or projectile 54A.

If signal pattern matches the object of interests that is to be detected by system 10, then the signal is amplified by the pattern on the photorefractive plate 114 at the Fourier transform plane 116. At the Fourier transform plane 116, a correlation is performed by one or more of the processors in system 10. Previous teachings required that the correlation is an integral of a pattern with a cross-correlation of another pattern that is separated by some distance. In the photorefractive plate 114 at the Fourier transform plane 116, instead of doing an integral, the system 10 needs only to perform a multiplication to do the correlation. This is because system 10 is modulating the transmission in phase in the non-linear crystal in the photorefractive plate 114 at the Fourier transform plane 116. This multiplication occurs optically.

When the lens or third optics 118, which is optically subsequent to the photorefractive plate 114 at the Fourier transform plane 116 in the optical order of operation, refocuses the light to perform an inverse transform optically. In one particular embodiment (but not necessarily in other embodiments), all of the correlation is performed solely optically. Since the system 10 is programming optically, which is accomplished through the bright laser beam 106 and the hologram 108, it creates a pattern in the non-linear crystal in the photorefractive plate 114 at the Fourier transform plane 116. The pattern matches the light incoming to the crystal, then there are hotspots on a focal image plane 120.

The focal image plane 120 is a coarse resolution relative to the object of interest. However, the hotspots on the focal image plane 120 identify that the object of interest may be at the particular location of the hotspot. The processor, such as GPU 124, or alternatively processor 18, communicates with detection logic 24 and/or cueing logic 26, which then tasks the high resolution cameras or imagers 126 or 226 to capture an image at that particular location corresponding to the hotspot on the focal image plane 120.

In one embodiment, the high resolution camera or imagers 126 may be a plurality of high resolutions camera that are fixed in position that cover the same field of view as the first wide field of view sensor or imager or reflector 102 in optical assembly 16A. Then, the camera or imager 126 pointed at the locations where the hotspot or the object of interest was detected, such as imager 126A, that imager 126A viewing that location is tasked to obtain a high resolution image rather than requiring all high resolution camera to view the entire scene at a single time. This will reduce the processing burden and speed up the detection time.

In a second embodiment, rather than having a high number of high resolution fixed camera or imagers, there may be a fewer number of high resolution cameras or imagers 226 that can each be steered slightly so that they can steer around to capture the information desired. This reduces the number of cameras required, but it does add some slight complexity of having a steering mechanism. However, the steering mechanism may be accomplished through a piezo electric tilt mechanism, thus the steering of the high resolution cameras or imagers 226 can be accomplished through a digital electronics. This would eliminate the need for physical components such as optical gimbals and therefore should not increase size, weight, cost or power in a significant manner to system 10.

With respect to the patterns or markers on hologram 108, the patterns or markers on hologram 108 may be adjusted or programmed for any object of interest. For example, if the desired object of interest was a missile or projectile 54A then the pattern may be associated with a bright rocket plume, or if the object of interest 54 is an aircraft, then the pattern can be a silhouette of an aircraft. Thus, the pattern or markers on hologram 108 depends on the object of interest that the system is looking attempting to detect. According to one aspect of the present disclosure, system 10 uses the hologram 108 to task or cue the array of high resolution imagers. In one embodiment, the holograms are hard-coded or not programmable. This depicts that the holograms do not necessarily need to be programmable or encoded but may rather be a fixed hologram. However, other embodiments utilize a programmable hologram 108. Another embodiment provides for a hologram 108 that is rotatable or moveable.

The photorefractive plate 114 is imparted with the pattern when the laser is active. The pattern in the photorefractive plate 114 may deactivate when the laser is turned off. Alternatively, if the hologram 108 changes, then the pattern on the photorefractive plate 114 changes.

It is possible for the operation of system 10 to include a beam splitter, such as beam splitter 130 shown in FIG. 4. The beam splitter 130 operates to receive light from the laser 106 in which half or a some other portion of the laser beam 106 is reflected by the beam splitter 130 and the other half or other portion of the laser beam 106 is sent to a beam dump, such as beam dump 122 (not shown in FIG. 4). Similarly, half or a portion of the light from the scene of the axicon mirror or reflector 102 is sent to the beam splitter 130 where half or the other portion is sent through the beam splitter 130 and combined with the laser. When the beam splitter 130 has a wide enough field of view, the beam splitter 130 needs to be oriented at an angle to effectuate the combination of the laser beam 106 and the light from the scene. When the output from the beam splitter 130 of the mixed laser and light from the scene meet at the Fourier plane, a multiplication occurs.

It is possible for the operation of system 10 to include a collimated light, such as the configuration shown in FIG. 6. This embodiment depicts that the laser beam 106 may be stacked or physically aligned with the axicon mirror or reflector 102 to eliminate the need for a beam splitter but the rest of the operation of the laser to the photo reactive plate is essentially the same.

The design of holographic filters optimized for wide FOV imaging through axicon optics provides advantages and accounts for the asymmetry of the holographic information of a given target. For example, it has been demonstrated that if a standard NATO tank in horizontal profile is holographically encoded into the intermediate focal plane, and that same tank is viewed in the far field of view, a bright autocorrelation spot is created in the final image of the area being viewed. If the tank is viewed in the field at either head-on or other aspect angles, the brightness of the autocorrelation spot is affected but remains nonetheless significant. In the case of sea-skimming missiles, the change in the holographic signature from a head-on aspect to a crossing aspect is more dramatic and asymmetric. This asymmetry is mitigated by encoding multiple targets and aspects in the holograms, to ensure missiles are detected with high confidence.

An additional consideration is the large number of imagers 126 or 126, which may also include sub-imagers, needed to cover the entire field of view at 20-micro-radian or better resolution. While only a few are active at any time, the failure of one may leave a gap in fine-resolution coverage. To mitigate this, a much smaller number (~100) of sub-imagers 226 could be used, if each is steered electronically, for example, by piezo-electric actuators. This option also includes an opportunity to enhance detection by super-resolution processing of multiple sub-imagers overlapped on the same target.

Accordingly, the embodiments of the present disclosure address the challenging problem of panoramic situational awareness that is seeing small threats in a very extended scene with manageable data rates. The optical processing methods (photorefractive amplification and holographic filters) are combined in a manner that is flexible and extensible, providing superior threat awareness for small targets at longer ranges than is conventionally possible.

The system 10 of the present disclosure may additionally include one or more sensor to sense or gather data pertaining to the surrounding environment or operation of the system 10. Some exemplary sensors capable of being electronically coupled with the system 10 of the present disclosure (either directly connected to the system 10 of the present disclosure or remotely connected thereto) may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, terrain climbed, local pressure changes, submersion in liquid; impellers measuring the amount of fluid passing thereby; Global Positioning sensors sensing location, elevation, distance traveled, velocity/speed; audio sensors sensing local environmental sound levels, or voice detection; Photo/Light sensors sensing ambient light intensity, ambient, Day/night, UV exposure; TV/IR sensors sensing light wavelength; Temperature sensors sensing machine or motor temperature, ambient air temperature, and environmental temperature; and Moisture Sensors sensing surrounding moisture levels.

The system 10 of the present disclosure may include wireless communication logic coupled to sensors on the system 10. The sensors gather data and provide the data to the wireless communication logic. Then, the wireless communication logic may transmit the data gathered from the sensors to a remote device. Thus, the wireless communication logic may be part of a broader communication system, in which one or several systems of the present disclosure may be networked together to report alerts and, more generally, to be accessed and controlled remotely. Depending on the types of transceivers installed in the system 10 of the present disclosure, the system may use a variety of protocols (e.g., WiFi, ZigBee, MiWi, Bluetooth) for communication. In one example, each of the system 10 of the present disclosure may have its own IP address and may communicate directly with a router or gateway. This would typically be the case if the communication protocol is WiFi.

As described herein, aspects of the present disclosure may include one or more electrical or other similar secondary components and/or systems therein. The present disclosure is therefore contemplated and will be understood to include any necessary operational components thereof. For example, electrical components will be understood to include any suitable and necessary wiring, fuses, or the like for normal operation thereof. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An optical detection system comprising:
a reflector that reflects scenery light containing an object of interest;
a laser generator that generates a laser beam;
a hologram having a marker corresponding to the object of interest, wherein the laser beam is configured to be transmitted through the hologram;
a photorefractive plate at a Fourier plane, wherein the photorefractive plate receives the laser beam and the scenery light, and the photorefractive plate is configured to amplify portions of the laser beam and the scenery light corresponding to the object of interest;
wherein the laser beam records the hologram of a Fourier transform at the Fourier plane, wherein the Fourier transform is formed directly or indirectly by optically transforming an image of the object of interest;
an image focal plane having a coarse first resolution, wherein the image focal plane has pixels that illuminate as hotspots corresponding with the object of interest;
a processor to process illuminated hotspots; and
at least one imager having a fine second resolution within a group of a plurality of imagers, wherein the at least one imager is cued in response to the processor identifying a hotspot in the image focal plane that is indicative of the object of interest.

2. The optical detection system of claim 1, wherein the hologram is located at the Fourier plane as part of the photorefractive plate.

3. The optical detection system of claim 2, wherein the hologram that is part of the photorefractive plate comprises non-object portions, wherein the marker and non-object portion cooperate to gather a signal for the object of interest, and the non-object portions removes background.

4. The optical detection system of claim 1, wherein the reflector has a 360° field of view.

5. The optical detection system of claim 1, wherein the reflector is an axicon mirror.

6. The optical detection system of claim 1, further comprising:

a first transfer optic that is optically between the reflector and the photorefractive plate; and a second transfer optic that is optically between the laser beam generator and the photorefractive plate.

7. The optical detection system of claim 6, further comprising:

a beam splitter that is optically subsequent to the first transfer optic and the second transfer optic.

8. The optical detection system of claim 7, wherein the photorefractive plate and the hologram is optically subsequent to the beam splitter.

9. The optical detection system of claim 6, further comprising:

a third transfer optic that is optically between the photorefractive plate and the image focal plane.

10. The optical detection system of claim 9, wherein the third transfer optic converts a de-focused image from the photorefractive plate into a focused image for the image focal plane.

11. The optical detection system of claim 1, further comprising:

a steering mechanism coupled to the at least one imager.

12. The optical detection system of claim 11, wherein the steering mechanism is a digital steering mechanism.

13. The optical detection system of claim 1, further comprising:

a non-linear crystal in the photo refractive plate that is encoded with a pattern that matches the marker corresponding to the object of interest.

14. The optical detection system of claim 1, wherein the scenery light and laser beam are collimated.

15. A method for an optical detection system, the method comprising:

reflecting, via a reflector, scenery light from a scene having an object of interest;

transmitting the scenery light to a photorefractive plate at a Fourier plane;

generating a laser beam;

transmitting the laser beam through a hologram to the photorefractive plate, the hologram having a marker corresponding to the object of interest;

optically transforming the scenery light and laser beam to identify the object of interest in the scenery light that matches the marker in the hologram to create an optical representation of the object of interest;

transmitting the identified optical representation of the object of interest to an image focal plane having a coarse first resolution;

identifying at least one pixel illuminated on the image focal plane corresponding to the identified optical representation of the object of interest; and capturing, via an image sensor, an image of the object of interest in the scene.

16. The method of claim 15, further comprising:

cueing the imager sensor to capture the image of the object of interest in the scene based on the at least one pixel in the image focal plane having been illuminated, wherein the image sensor has a fine second resolution and the image sensor is part of a plurality of image sensors.

17. The method of claim 16, further comprising:

steering the image sensor to a location to capture the image of the object of interest.

18. The method of claim 15, further comprising:

splitting, via a beam splitter, the laser beam and the scenery light, wherein the beam splitter is optically prior to the photorefractive plate.

19. The method of claim 15, further comprising:

focusing defocused light from the photorefractive light onto the image focal plane.

* * * * *